United States Patent [19]

Suzuki

[11] Patent Number: 5,448,614
[45] Date of Patent: Sep. 5, 1995

[54] FLUOROSCOPIC IMAGING SYSTEM

[75] Inventor: Hidefumi Suzuki, Mishima, Japan

[73] Assignee: Shimadzu Corporation, Kyoto, Japan

[21] Appl. No.: 212,830

[22] Filed: Mar. 15, 1994

[30] Foreign Application Priority Data

Mar. 31, 1993 [JP] Japan ................... 5-098638

[51] Int. Cl.6 ............................................. H05G 1/24
[52] U.S. Cl. ..................... 378/115; 378/106; 378/112
[58] Field of Search ............ 378/98.3, 101, 106, 378/108, 110, 111, 109, 112, 114, 115, 116

[56] References Cited

U.S. PATENT DOCUMENTS 5,023,896  6/1991  Yokouchi et al. ............ 378/98.3
5,119,409  6/1992  Nields et al. ................. 378/106

Primary Examiner—David P. Porta
Assistant Examiner—Don Wong
Attorney, Agent, or Firm—Oliff & Berridge

[57] ABSTRACT

In an interventional radiography (IVR), for example in a percutaneous transluminal coronary angioplasty (PTCA), when the IVR includes a period in which the movement of the object is slow, a normal X-ray radiating mode (a continuous X-ray radiation or a normal rate pulse radiation of about 15-30 pulses per second) is changed to a very slow rate pulse X-ray radiation of about 1-5 pulses per second to decrease the X-ray dose of the patient. Since the movement is slow, the very slow rate pulse radiation can still trace the movement adequately. Further, the quality of the X-ray image is improved by increasing the tube current in the very slow rate pulse radiation because less heat is generated in the X-ray tube.

5 Claims, 5 Drawing Sheets 5,448,614

FLUOROSCOPIC IMAGING SYSTEM

The present invention relates to a fluoroscopic imaging system used in medical diagnosis or in medical treatment.

BACKGROUND OF THE INVENTION

A fluoroscopic imaging system provides a real time X-ray image of an appropriate part of an examinee or a patient on a monitor display using a television system, and is widely used in various clinical fields including angiography or interventional radiography (IVR). Among the IVR is included a percutaneous transluminal coronary angioplasty (PTCA).

In a PTCA, a catheter is inserted in the patient's circulatory system toward the heart, an inflatable balloon at the end of the catheter is placed at a stenosis in the coronary, and the balloon is inflated several times to cure the stenosis. The steering operation of the balloon catheter in the circulatory system and the inflating operation of the balloon at the stenosis are conducted with the assistance of a fluoroscopic image. The fluoroscopic image in this case is normally obtained using a continuous X-ray or a pulsewise X-ray of 15–30 pulses per second (pps). Since the inflation of the balloon needs strict time control including the length of inflating time and the number of times of the inflation, and they must be recorded, a stopwatch or a timer equipped in the fluoroscopic imaging system is used.

Since an IVR generally requires difficult techniques, and thus the fluoroscopic imaging lasts a long time (sometimes several times as long as that of a normal angiography), the X-ray dose of the patient would be a problem.

SUMMARY OF THE INVENTION

An object of the present invention is therefore to decrease the amount of the X-ray dose of the patient in an IVR procedure. Thus the fluoroscopic imaging system according to the present invention includes the following elements:

a) a high voltage source for applying a high voltage to an X-ray tube according to given parameters;
b) an image intensifier for converting an X-ray from the X-ray tube to a visible image
c) a television system for showing the visible image on a monitor display;
d) a memory for storing parameters of a normal X-ray radiating mode and a very slow rate pulse X-ray radiating mode in which a series of pulsewise X-ray is radiated at a rate of not greater than 10 pulses per second
e) a mode switch; and
f) a mode controller responsive to an operation of the mode switch for retrieving a set of parameters corresponding to the very slow rate pulse X-ray radiating mode from the memory and giving the set of parameters to the high voltage source.

Further features and details of the present invention are described in the following description of the preferred embodiment.

DETAILED DESCRIPTION OF A PREFERRED EMBODIMENT

Figure 1:
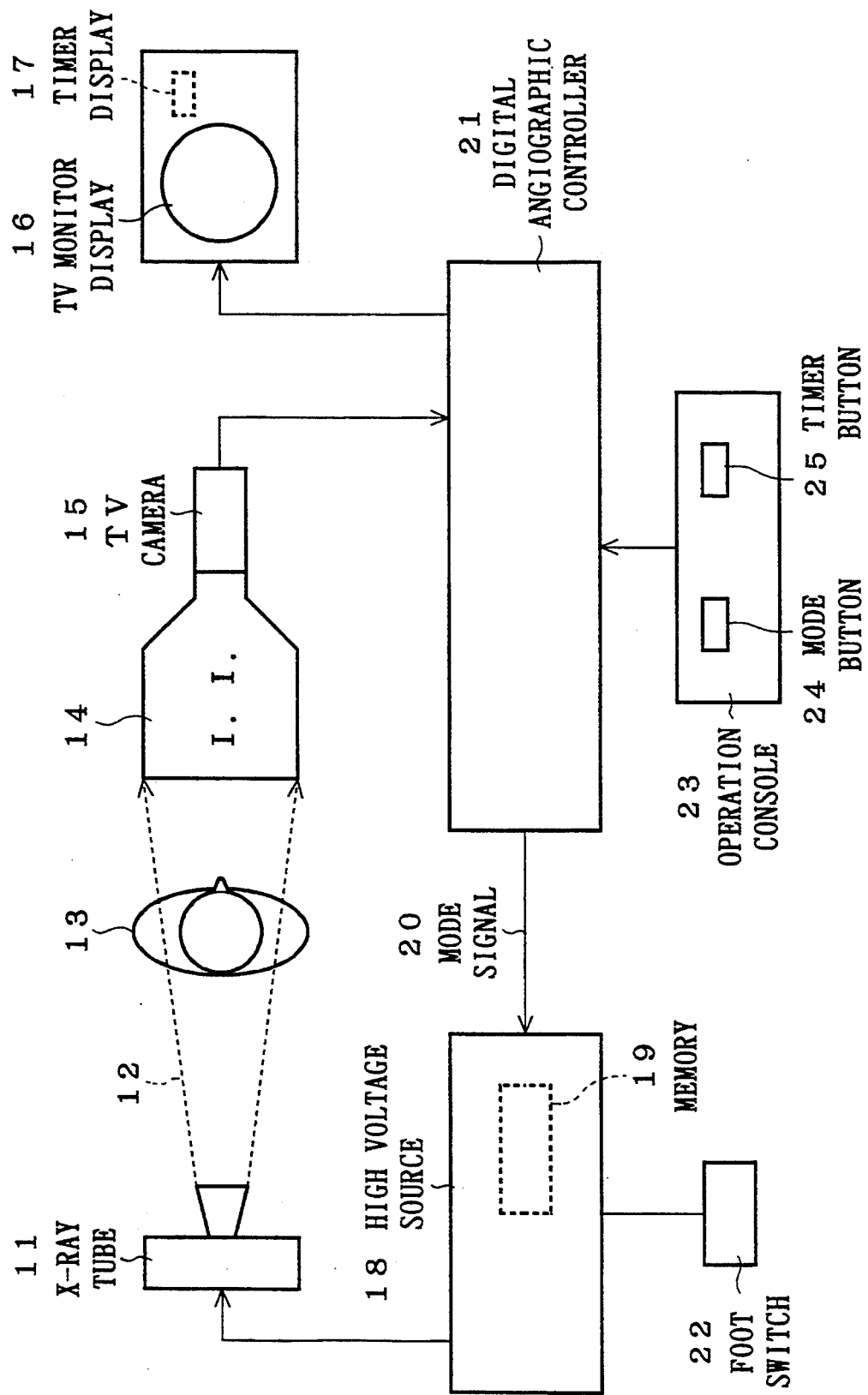
FIG. 1 is a system construction diagram of a fluoroscopic imaging system as an embodiment of the present invention.
Figure 2:
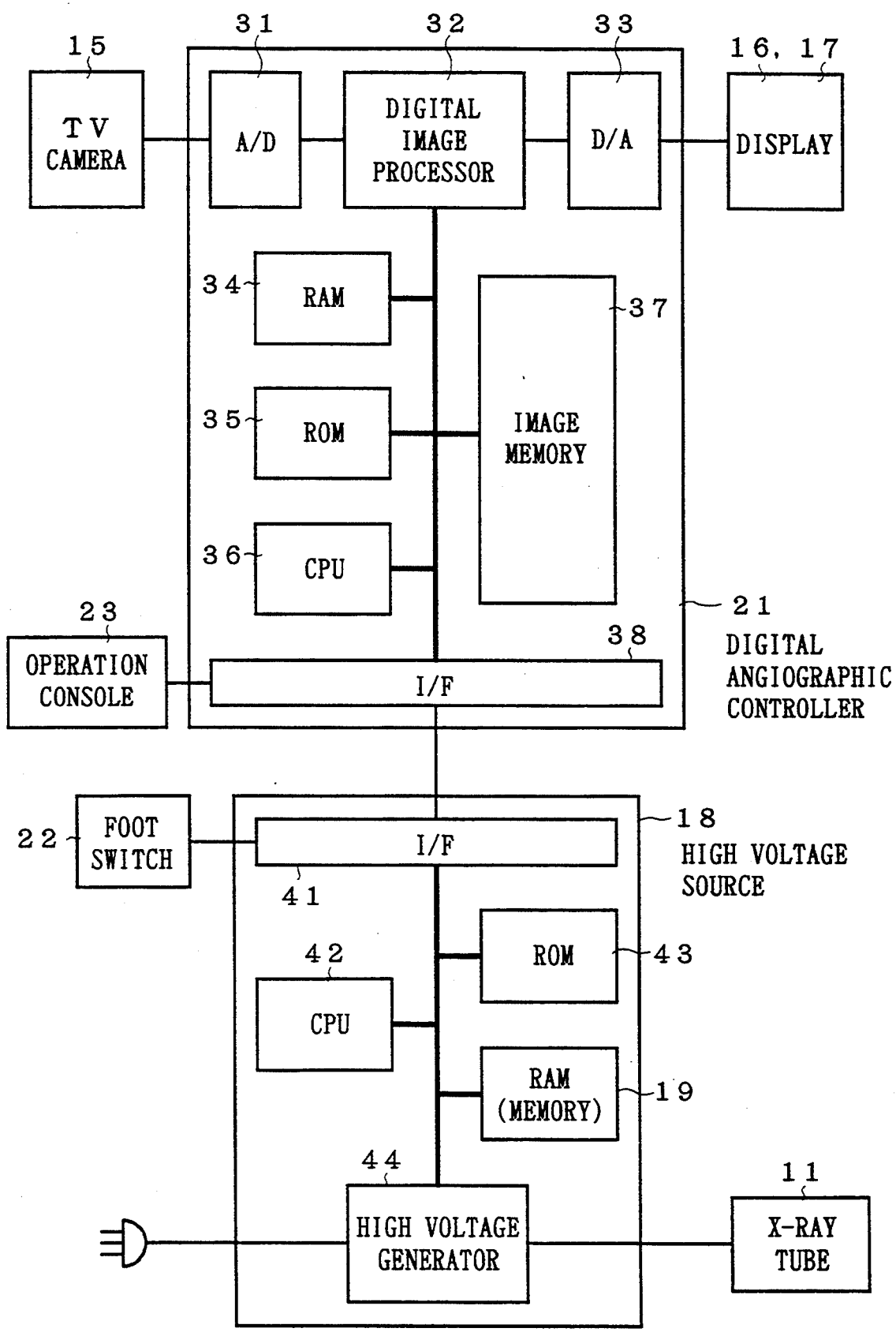
FIG. 2 is a block diagram of the control system of the fluoroscopic imaging system.

A preferred embodiment of the present invention is described referring to FIGS. 1 to 5C. In FIG. 1, the X-ray tube 11 receives a high voltage from the high voltage source 18 and radiates a beam of X-ray 12 toward the object 13. The X-ray that passes through the object 13 enters the image intensifier (I.I.) 14, where an X-ray image is formed on a screen and taken by the TV camera 15. The video signal of the X-ray image generated by the TV camera 15 is sent to the digital angiographic controller 21 which is detailed in FIG. 2.

The analog video signal from the TV camera 15 is first converted to digital image data in the A/D converter 31, and various image processings (such as noise filtering or edge emphasizing) are performed on the X-ray image data in the digital image processor 32. The processed image data is again converted to analog video signal in the D/A converter 33 and sent to a TV monitor 16 in the display device. The real time X-ray image of the object 13 is thus shown on the screen of the TV monitor 16. The digital angiographic controller 21 further includes a CPU 36, a RAM 34 and a ROM 35 for controlling the digital image processor 32. The CPU 36 also functions as a timer according to a program stored in the ROM 35. When the operator pushes a timer button 25 on the operation console 23, the CPU 36 starts counting a time length until the timer button 25 is operated again. A mode button 24 is also provided on the operation console 23 for changing, as described later, the X-ray radiating mode.

Figure 5A:
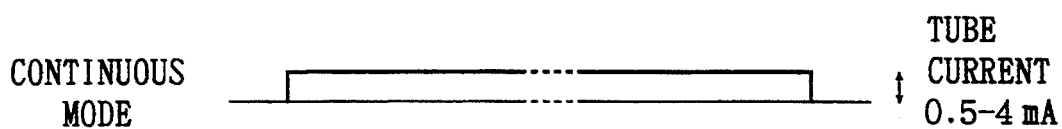
FIGS. 5A through 5C are timecharts showing respectively the continuous X-ray radiating mode, the normal rate pulse X-ray radiating mode and the very slow rate pulse X-ray radiating mode.
Figure 5B:
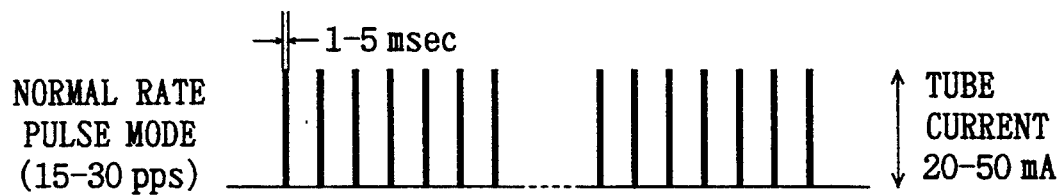

The high voltage source 18 includes a memory 19 for storing parameters of X-ray radiating conditions of every mode: i.e., tube voltage and tube current for the continuous radiating mode; and, in addition to those parameters, pulse rate and pulse width for the normal rate pulse X-ray radiating mode and the very slow rate pulse X-ray radiating mode. The high voltage source 18 also includes a CPU 42 for controlling the high voltage source 18 according to programs stored in the ROM 43 and to commands given from the digital angiographic controller 21. When the high voltage source 18 receives a mode signal 20 from the digital angiographic controller 21, the CPU 42 of the high voltage source 18 retrieves parameters of the designated mode from the memory (RAM) 19 and sets the high voltage generating conditions of the high voltage generator 44 according to the retrieved parameters. Thus the X-ray tube 11 generates a continuous X-ray as shown in FIG. 5A, a normal rate pulse X-ray as shown in FIG. 5B or a very slow rate pulse X-ray as shown in FIG. 5C.

Figure 3A:
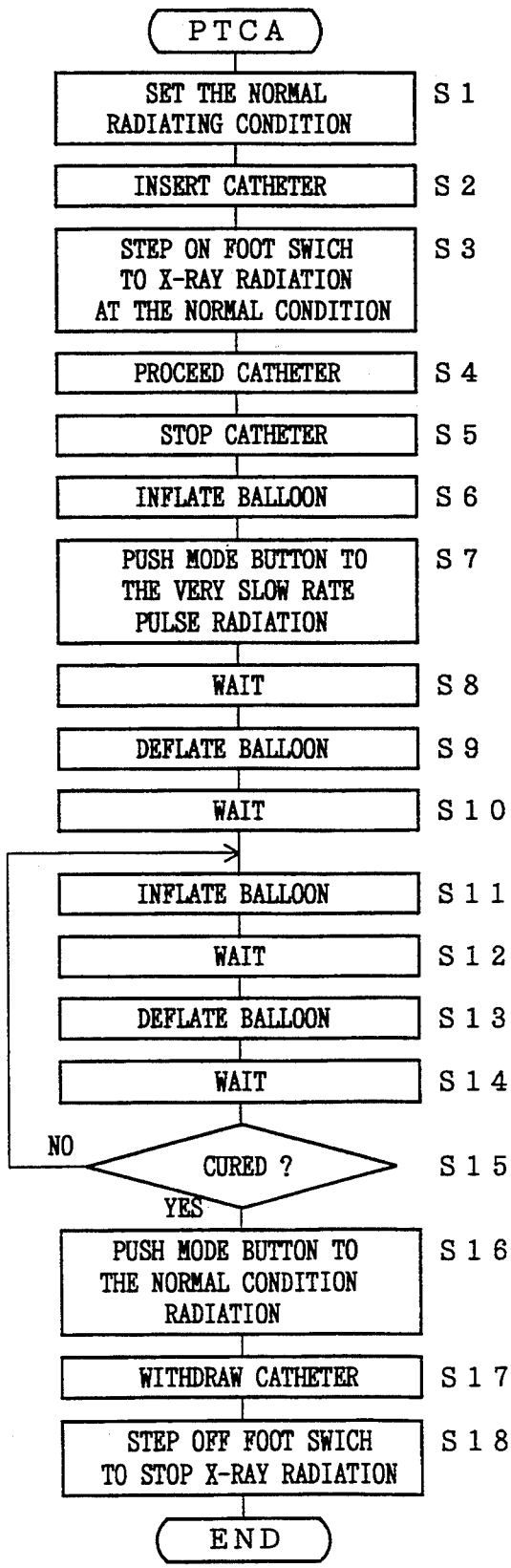
FIG. 3A is a flowchart of a PTCA operation.
Figure 4A:
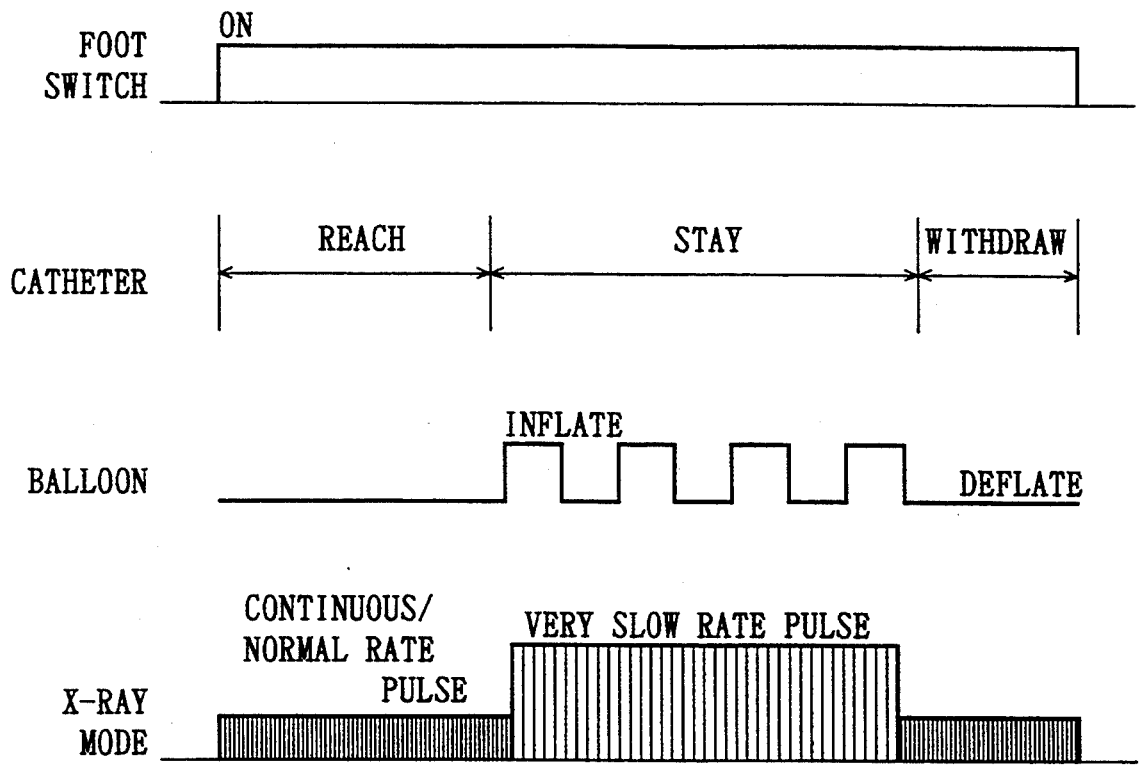
FIG. 4A is a timechart of the state of the foot switch, catheter, balloon and X-ray radiating mode in the PTCA operation.

Procedure of a PTCA operation is then described referring to the flowchart of FIG. 3A and the timechart of FIG. 4A. First, the normal X-ray radiating mode is set at step S1. Here the normal X-ray radiating mode is either the continuous X-ray radiating mode shown in FIG. 5A or the normal rate pulse X-ray radiating mode shown in FIG. 5B. When the X-ray is continuously radiated onto the object 13 as in FIG. 5A, the electric current for the X-ray tube 11 is normally about 0.5–4 mA. In the normal rate pulse X-ray radiating mode as in FIG. 5B, the pulse rate is set at about 10–60 pps, preferably at about 15–30 pps, to obtain a real time image and the pulse width is set at about 1–5 msec. The tube current may be increased to about 20–50 mA in this mode.

Figure 4B:
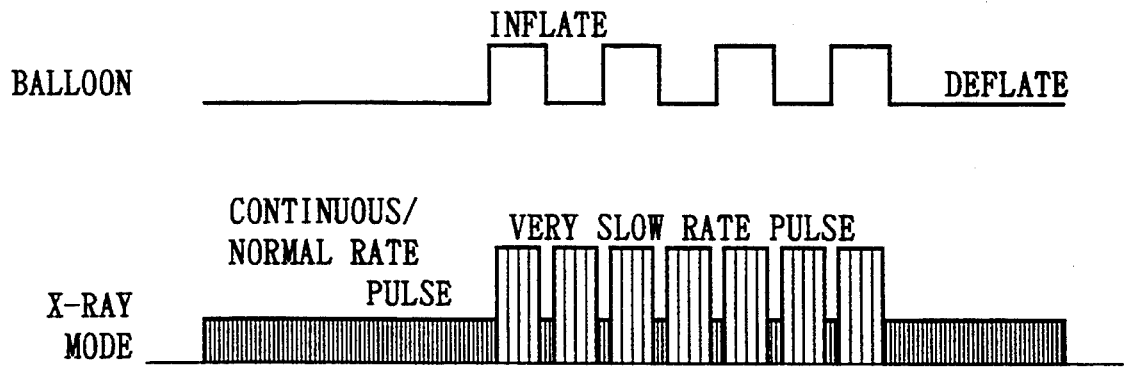
FIG. 4B is an alternative timechart of the X-ray radiating mode.

Then the doctor inserts a balloon catheter into the patient's circulatory system (step S2) and steps on the foot switch 22 (step S3) to start radiation of the X-ray at the normal mode (the continuous X-ray radiating mode or the normal rate pulse X-ray radiating mode) set at step S1. The foot switch 22 must be kept stepped down to continue the X-ray radiation as shown in FIG. 4A. While the doctor advances the catheter in the circulatory system toward the heart (step S4), he watches the TV monitor 16 to ascertain the right path. When the balloon of the catheter is correctly located in a stenosis of the coronary, the catheter is stopped (step S5). The normal mode for the fluoroscopic image, i.e., the continuous radiation as shown in FIG. 4A or the normal rate pulse radiation (15–30 pps) as shown in FIG. 4B, provides a smooth moving image on the TV monitor 16, and enables the doctor to closely and assuredly follow the movement of the catheter and to locate it in the right position.

Figure 5C:
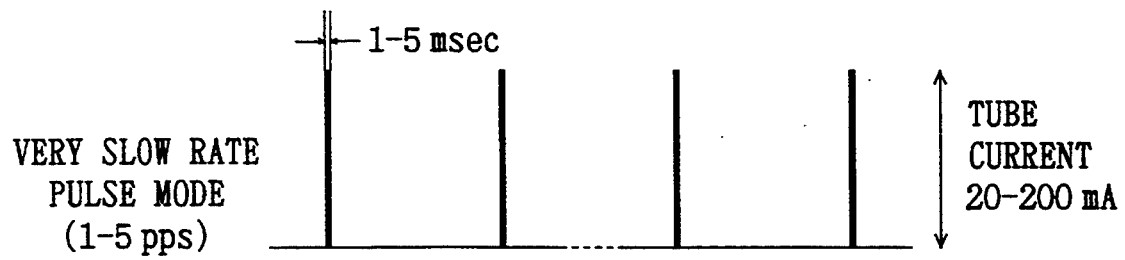

Then the doctor inflates the balloon at the end of the catheter (step S6), and pushes the mode button 24 on the operation console 23 (step S7) to change the X-ray radiating mode to the very slow rate pulse X-ray radiating mode as shown in FIG. 5C. In the very slow rate pulse X-ray radiating mode, the pulse rate is reduced to 0.5–10 pps, or more favorably, to 1–5 pps. The very slow rate pulse radiation greatly reduces the X-ray dose of the patient compared to the continuous or normal rate pulse X-ray radiation. And, since there is little movement in the X-ray image shown on the TV monitor 16 while the balloon is inflated in the stenosis, the very slow rate pulse radiation can still provide an adequate observation image. As shown in FIGS. 5B and 5C, the tube current of the very slow rate pulse radiation can be made greater than that of the normal rate pulse radiation (while the X-ray dose is kept less), because the very low pulse rate generates less heat in the X-ray tube 11. The increase in the tube current in the very slow rate pulse X-ray radiating mode improves the quality of the image on the TV monitor 16.

While the balloon is kept inflated (step S8), the doctor measures the time length until a preset time period (up to several minutes) expires. When a round of balloon inflation ends, the doctor deflates the balloon (step S9) and waits for a preset time period (step S10). Then the balloon is inflated and deflated again (steps S11 and S13) with the preset time intervals (steps S12 and S14). Every time such an inflating/deflating operation is finished, the doctor diagnoses whether the stenosis has been cured (step S15). If not yet cured, the steps S11 through S14 are repeated several times. When the stenosis is diagnosed to be cured, the X-ray radiating condition is returned to the normal condition (step S16) and the doctor withdraws the catheter (step S17), and steps off the foot switch 22 to stop the X-ray radiation (step S18).

In the above embodiment, as shown in FIG. 4A, the X-ray radiating mode is kept at the very slow rate pulse X-ray radiating mode while the balloon is inflated and deflated repeatedly. It is possible otherwise, as shown in FIG. 4B, to return to the normal mode (continuous X-ray radiating mode or normal rate pulse X-ray radiating mode) every time when the balloon is being inflated or deflated.

Figure 3B:
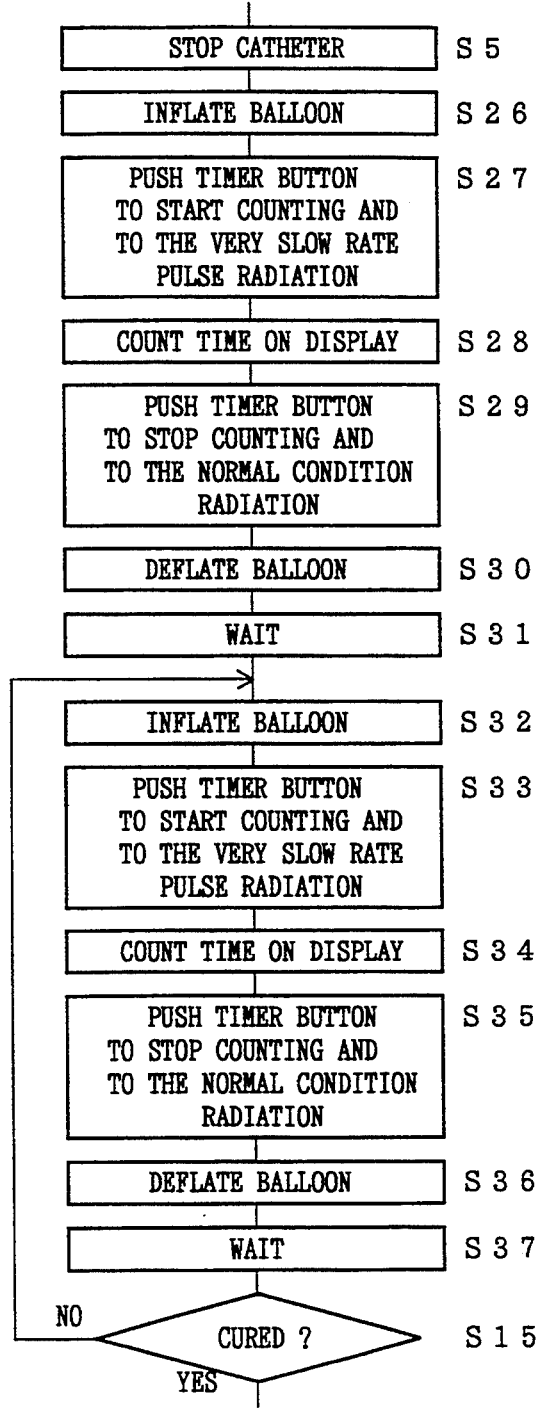
FIG. 3B is an alternative of a part of the flowchart.

The timer button 25 can be used, instead of the mode button 24, to change the radiating mode. When the timer button 25 on the operation console 23 is pushed after the balloon is inflated (steps S26, S32), as shown in the flowchart of FIG. 3B, to change to the very slow rate pulse X-ray radiating mode (steps S27, S33), the CPU 36 of the digital angiographic controller 21 starts measuring time, as well as sending the mode signal 20 to the high voltage source 18, and a signal representing the passing time is sent to the timer display 17. The timer display 17 show the time length since the balloon is inflated (steps S28, S34), whereby the doctor need not measure the time himself. When the preset time elapses, the doctor pushes the timer button 25 again (steps S29, S35) (the mode button 24 may be used instead), whereby the X-ray radiation returns to the normal mode and the timer stops. Though, in general, no time measuring is necessary when the balloon is deflated (steps S30, S31, S36, S37), the timer button 25 or the mode button 24 can be operated every time the balloon is inflated or deflated, as in FIG. 4B, to minimize the X-ray dose.

The present invention can be applied to any IVRs, as well as the PTCA as described above, when an IVR includes a period in which the movement of the object is slow and the very slow rate pulse fluoroscopy is sufficient to trace the movement.

What is claimed is:

1. A fluoroscopic imaging system comprising;
   a) a high voltage source for applying a high voltage to an X-ray tube according to given parameters;
   b) an image intensifier for converting an X-ray from the X-ray tube to a visible image;
   c) a television system for showing the visible image on a monitor display
   d) a memory for storing parameters of a normal X-ray radiating mode and a very slow rate pulse X-ray radiating mode in which a series of pulsewise X-ray is radiated at a rate of not greater than 10 pulses per second;
   e) a mode switch and
   f) a mode controller responsive to an operation of the mode switch for retrieving a set of parameters corresponding to the very slow rate pulse X-ray radiating mode from the memory and giving the set of parameters to the high voltage source.

2. The fluoroscopic imaging system according to claim 1, wherein the normal X-ray radiating mode includes a continuous radiating mode in which a continuous X-ray is radiated and a normal rate pulse X-ray radiating mode in which a series of pulsewise X-ray is radiated at a rate of greater than 10 pulses per second.

3. The fluoroscopic imaging system according to claim 2, wherein an electric current supplied to the X-ray tube in the very slow rate pulse X-ray radiating mode is set greater than that in the normal rate pulse X-ray radiating mode.

4. The fluoroscopic imaging system according to claim 1, wherein the pulse rate of the very slow rate pulse X-ray radiating mode is not greater than 5 pulses per second.

5. The fluoroscopic imaging system according to claim 1, wherein the fluoroscopic imaging system further comprises a timer for counting a length of time since the mode switch is operated and for showing the time length on a timer display.

* * * * *